United States Patent
Proudian et al.

[15] 3,671,927
[45] June 20, 1972

[54] AIRCRAFT VORTEX DETECTION SYSTEM

[72] Inventors: Andrew Peter Proudian, Chatsworth; Martin Balser, Covina, both of Calif.

[73] Assignee: Xonics Inc., Van Nuys, Calif.

[22] Filed: Dec. 14, 1970

[21] Appl. No.: 97,765

[52] U.S. Cl. ............................................. 340/1 R, 340/3 D
[51] Int. Cl. ......................................................... G01s 9/66
[58] Field of Search ............... 340/1 R, 3 D, 3 FM, 3 R, 16 R, 340/15; 343/5 W

[56] References Cited

UNITED STATES PATENTS 3,028,578  4/1962  Stanton .................................. 340/1 R

*Primary Examiner*—Richard A. Farley
*Attorney*—Harris, Kiech, Russell & Kern

[57] ABSTRACT

A system for detection and measurement of aircraft wing tip vortices. An acoustic radar with transmitter and receiver spaced from each other in a plane perpendicular to the flight path for illuminating the vortex and picking up scattering of the transmitter signal produced by the vortex, using Doppler frequency spectrum analysis with the maximum and minimum frequencies providing a measure of vortex intensity. A plurality of receivers operating with a common transmitter providing coverage of an area of interest along a flight path.

10 Claims, 6 Drawing Figures

INVENTORS.
ANDREW PETER PROUDIAN
MARTIN BALSER
BY THEIR ATTORNEYS
HARRIS, KIECH, RUSSELL & KERN

AIRCRAFT VORTEX DETECTION SYSTEM

This invention relates to a new and improved system for the remote detection and measurement of vortices produced by aircraft in flight. A pair of counter circulating wind funnels or vortices are formed behind the tips of the wind of an aircraft in flight due to the lift generated by the wing. These vortices are often referred to as the tip vortices or wing tip vortices.

The vortices shed by large aircraft constitute a hazard to smaller trailing aircraft. Controlled tests have shown that such vortices produce large rolling movements in aircraft flying through them at distances up to five miles behind the generating aircraft. The movement and decay of such vortices are variable, depending on the type of generating craft and on atmospheric conditions, and are not sufficiently predictable to provide reliable information to the pilot of a trailing aircraft as to when a vortex constitutes a potential threat to his aircraft so that he may take the proper precautionary action. The problem is particularly acute near and around airports where the aircraft traffic density is high and where the low flight altitudes make loss of control more hazardous. It should be noted that aircraft operation around an airport with separation maintained so great that preceding aircraft vortices can safely be assumed to have dissipated, is not consistent with normal high-density airport operation requirements.

It is therefore highly desirable to have a system that can detect and locate wing tip vortices and determine their strength, so as to permit avoidance of severe vortices by trailing aircraft vulnerable to them, and it is an object of this invention to provide such a system.

No satisfactory detection system is presently known. Conventional radar is very weakly sensitive to the presence of vortices, and an expensive, high-power radar would be required to achieve detection. Infrared and microwave radiometry have been attempted without satisfactory results. A laser detection technique has been demonstrated, but it has poor range, requires expensive and delicate instrumentation, and is blinded by snow, fog and rain.

The present invention incorporates an acoustic Doppler radar providing a simple and rugged aircraft vortex remote detection system which can monitor the air space near and around airports and provide information for pilot and/or control tower personnel on the location and severity of vortices. The information provided by the system on vortex intensity and location can be used in the control of trailing aircraft and in the study of vortex development and structure.

Other objects, advantages, features and results will more fully appear in the course of the following description. The drawings merely shown and the description merely describes preferred embodiments of the present invention which are given by way of illustration or example.

Figure 1:
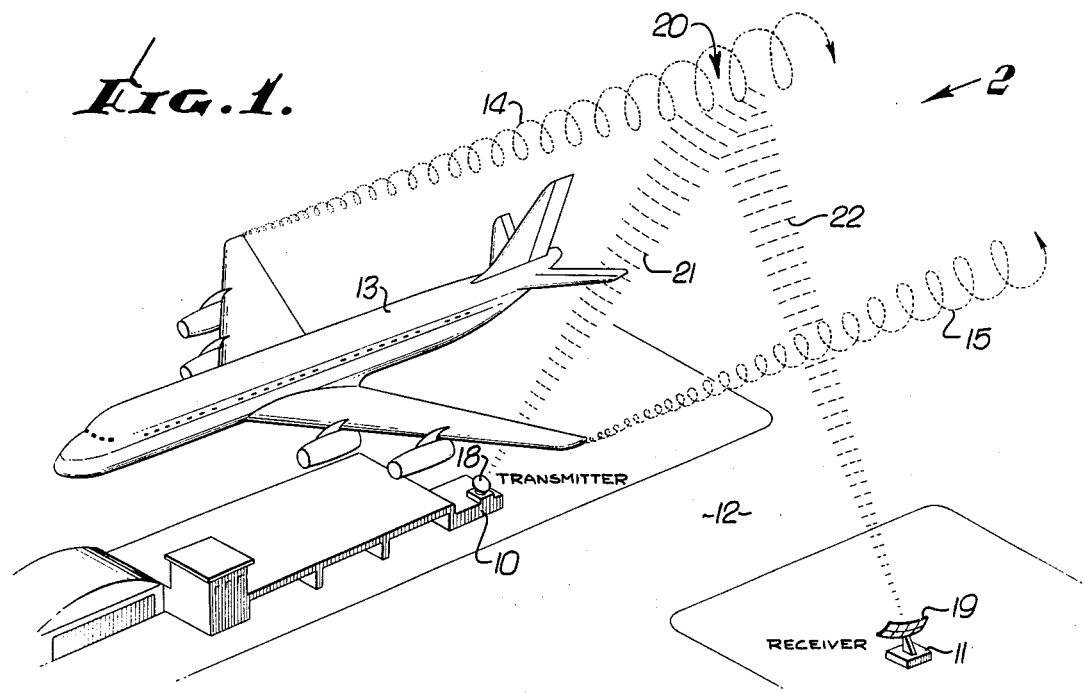
FIG. 1 is a perspective view illustrating a vortex detection installation at an airport and incorporating a preferred embodiment of the present invention.

Referring to FIG. 1, a transmitter 10 and a receiver 11 are positioned at an airport, typically on opposite sides of a runway 12. An aircraft 13 in flight generates counter rotating vortices 14, 15 at the tips of the wing. The transmitter and receiver are operated in the acoustic frequency range to provide an acoustic radar, with the transmitter antenna 18 and the receiver antenna 19 directed to a zone indicated generally at 20.

The transmitter directs a beam 21 of acoustic energy to the zone 20. When there is a vortex in this zone, the energy from the transmitter is scattered and portions thereof, indicated by the beam 22, are picked up by the receiver. The reception of this scattered energy from the transmitter indicates the existence of a vortex in the zone 20. The ground locations of the transmitter and receiver and the axes of the beams 21, 22 provide the location for the zone. The receiver output may be processed to provide a signal indicative of the intensity of the vortex detected in the zone.

Acoustic radars typically are operated in the frequency range up to about 10 khz and in the system of the present invention, it is preferred to operate in the range of about 2 to 6 khz. The acoustic radar in the vortex detection system is operated as a bistatic Doppler radar system. The propagation of acoustic waves in the atmosphere is affected by inhomogeneities of temperature and density in the atmosphere, as well as by small-and-large-scale winds. In particular, small-scale temperature and density inhomogeneities and small-scale turbulence result in the scattering of acoustic waves propagating through the atmosphere. The scattered waves resulting when a monochromatic wave is incident on a region of turbulence (with or without temperature inhomogeneities) are not monochromatic, but contain a range of frequencies corresponding to the range of air velocities in the scattering region. It should be noted that the principle of scattering of acoustic waves by inhomogeneities in the index of refraction is quite similar to that of electromagnetic waves. In the acoustic case however velocity fluctuations by themselves, in an otherwise perfectly homogeneous atmosphere constitute fluctuations in the index of refraction and thereby act as a source of scattering detectable by an acoustic radar system. In contrast, in the electromagnetic radar case, including lasers, some other type of inhomogeneity is required to produce sufficient refractive index fluctuations, or else aerosols or some other scattering material is required to render turbulence detectable.

Figure 2:
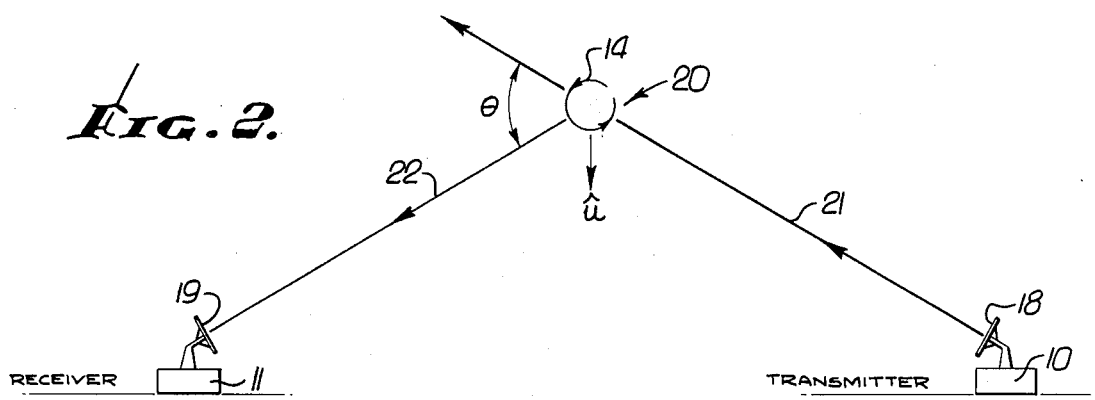
FIG. 2 is a view of the system of FIG. 1 looking along the flight path as indicated by the arrow 2.

The basic mode of operation of the acoustic Doppler radar vortex detection system is therefore to transmit an acoustic wave of frequency $f$ in a narrow beam and to detect the presence of a vortex in the beam path by detecting the acoustic wave scattered from the vortex by the velocity fluctuations within it. One measure of the intensity of the vortex can be determined from the Doppler frequency spectrum of the scattered signal, as follows: The velocity $v$ corresponding to a given Doppler shift frequency $f_d$ is given by the relation $$f_d = 2f(v/c) \sin \theta/2$$

where $f$ = transmitted frequency, $v$ = velocity of scattering element in the direction $u$ bisecting the angle between the incident and scattered wave vectors, $c$ = speed of sound in air, and $\theta$ = scattering angle (see FIG. 2).

The preferred configuration of the system is one in which the incident wave vector (as determined by the transmitted beam 21 direction) and the scattered wave vector (determined by the receiver beam 22 direction) are such that the direction $u$ is substantially normal to the vortex axis (i.e., to the generating aircraft flight path), so that the Doppler spectrum of the received signal is affected primarily by the tangential wind velocities in the vortex. This may be achieved by positioning the transmitter and receiver so that the transmitter, the receiver and the zone of interest 20 lie in a plane generally perpendicular to the aircraft flight path. The maximum (positive and negative) Doppler shifts of the scattered signal will then be determined primarily by the maximum tangential velocity $v_{max}$ present in the vortex, with a maximum positive frequency shift (relative to the central frequency of the scattered signal) equal approximately to $$f_{d+} = 2f \frac{v_{max}}{c} \sin \frac{\theta}{2}$$

and a maximum negative shift $$f_{d-} = 2f \frac{v_{max}}{c} \sin \frac{\theta}{2}$$

The total Doppler width $$f_{d_t} = f_{d+} - f_{d-} = 4f \frac{v_{max}}{c} \sin \frac{\theta}{2}$$

provides a direct measure of the maximum vortex tangential velocity, the prime characteristic of the vortex and principal measure of its strength. The transmitted beamwidth preferably is selected in such a way that the main part of the vortex can be contained within or illuminated by the transmitted beam at one time, and the receiver beamwidth preferably is similarly selected, so that the system is capable of "seeing" the entire vortex and its characteristic velocity structure.

Figure 3:
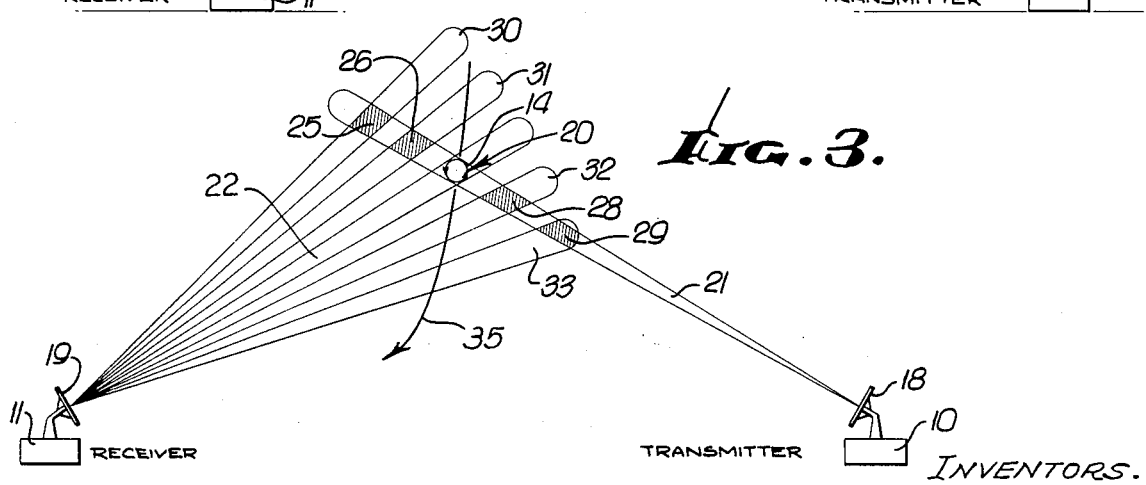
FIG. 3 is a view similar to that of FIG. 2 illustrating an alternative embodiment of the system.

The system of FIG. 2 illustrates the use of a transmitter with a beam 21 and a receiver with a beam 22 for detecting the presence of a vortex in a zone 20. FIG. 3 illustrates an alternative embodiment for detecting the presence of a vortex in a plurality of adjacent zones indicated as 25, 26, 20, 28 and 29, with all of the zones illuminated by the beam 21 from the transmitter. The receiver provides beams for picking up scattering from each of the zones, indicated as beams 30, 31, 22, 32, and 33. This is readily achieved by utilizing a separate antenna for each beam or by utilizing a single antenna with electronic or mechanical scanning. Additional zones may be illuminated by providing additional beams at the transmitter with a plurality of antennas or by means of scanning.

In a typical system, the transmitting and receiving antennas consist of arrays of transmitting and receiving elements, thereby permitting electronic scanning and the simultaneous formation of multiple beams. The transmitted signal consists of a continuous monochromatic wave or a pulse train at one or more frequencies, and the received signal in each receiver channel is fed to a spectrum analyzer with a non-coherent integrator and suitable displays. The information about the location of the vortex is contained in the known angular positions of the transmitter and receiver beams in continuous wave operation. Range gating may be added to provide finer spatial resolution in the vertical direction in pulsed operation. The information about the intensity of mean and turbulent winds in the vortex is contained in the frequency shift and spreading of the received signal.

Referring again to FIG. 3, in the operation of the bistatic acoustic radar system, an acoustic beam 21 is formed by a transmitting antenna 18. A set of beams, five in the embodiment disclosed 30, 31, 22, 32, 33, is formed by an array receiving antenna, indicated at 19, separated from the transmitter by a distance of the order of 300 meters. These receiver beams intersect the transmitted beam to establish a set of common volumes or zones 25, 26, 20, 28, 29. When a turbulent disturbance such as the vortex 14 is introduced into one of these zones, such as zone 20, energy is scattered out of the transmitted beam into the receiver beam intersecting that zone, and is fed into the receiver channel appropriate to that beam. The disturbance, the vortex 14 caused by the airplane 13 that has passed overhead a short time earlier, is shown as descending through zone 20 along the vortex trajectory 35.

Figure 4:
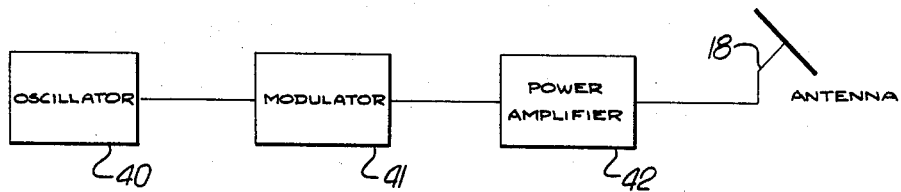
FIG. 4 is a block diagram of a transmitter suitable for use with the system of FIG. 1.

The transmitter includes an oscillator 40, a modulator 41 and a power amplifier 42 (FIG. 4). The oscillator 40 generates the basic transmitting frequency, typically 5 khz. The modulator 41 may pass the signal from the oscillator 40 unmodified for continuous wave (CW) operation or it may, if desired, pulse the signal to produce further spatial resolution beyond what is afforded by the common antenna zones or volumes. The power amplifier 42 amplifies the signal to a level of several watts and feeds it into the transmitting antenna 18. The antenna is an acoustic (not electromagnetic) radiator consisting of an array of acoustic transducers, typically loudspeakers. It can be readily seen by referring to FIG. 3 that one additional transmitter beam displaced from the first beam 21 would result in five new zones, and further additional transmitter beams would each result in five additional zones. These additional transmitter beams could be created in the transmitter by phasing techniques similar to those used in the receiver array. In CW operation, the different beams would be generated at frequencies separated by at least the largest expected Doppler shift, typically by 500 Hz or more, so that all the different zones may be easily distinguished. In pulsed operation, a single frequency could be transmitted into a broad transmitted beamwidth to achieve similar spatial coverage.

Figure 5:
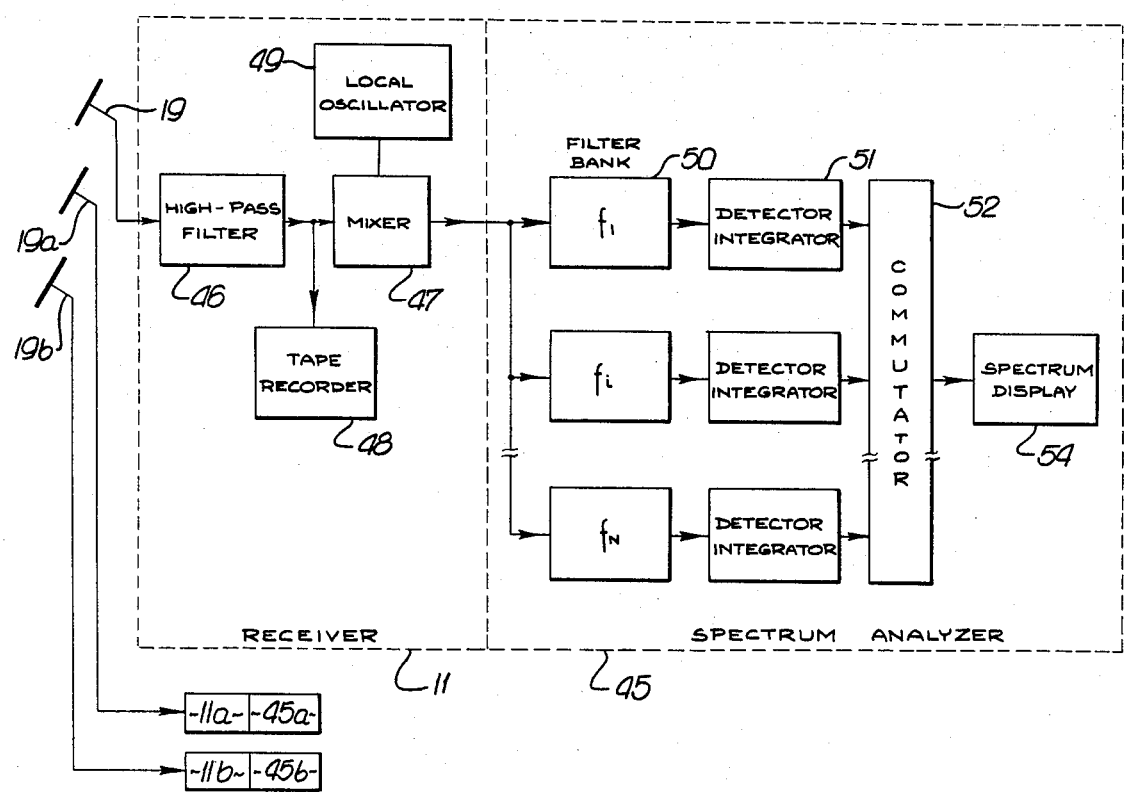
FIG. 5 is a block diagram of a receiver and analyzer suitable for use with the system of FIG. 1.

FIG. 5 illustrates a receiver channel comprising antenna 19, receiver 11 and spectrum analyzer 45. The signal from the antenna beam is fed by the receiving antenna 19 through a high pass filter 46 to a mixer 47 of the receiver 11. The high pass filter 46 is designed to cut off just below the operating frequency of the acoustic radar in order to eliminate the great majority of ambient noise, most of which appears below 2 khz. The signal from the filter 46 may be recorded on a tape recorder 48 for later replay, if desired. A local oscillator 49 provides a signal for the mixer at the frequency offset from the chosen operating frequency of the radar by such an amount that when combined in the mixer 47 with the received signal, the output of the receiver to the analyzer is within the range of the analyzer, which is a fixed frequency signal processing unit.

The analyzer 45 may be a conventional spectrum analyzer incorporating a bank of parallel fed band pass filters 50, each having a narrow pass band or frequency channel identified as $f_i$ through $f_n$. The output of each filter 50 is directed to a detector-integrator 51 which provides an output voltage varying in magnitude as a function of the magnitude of the received signal within the pass band of the preceding filter.

Figure 6:
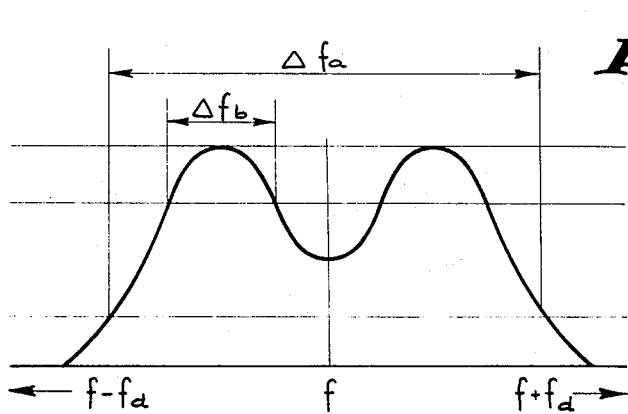
FIG. 6 illustrates a typical spectrum display of the analyzer of FIG. 5.

A commutator 52 rapidly samples the output of each frequency channel of the analyzer, coupling the outputs to a spectrum display unit 54. The display unit may be a recorder or an oscilloscope or the like, and a typical display is illustrated in FIG. 6 with frequency on the horizontal axis and signal intensity on the vertical axis. The band width of the spectrum at a specific intensity, such as the band width $\Delta f_a$ provides a measure of the velocity in the vortex, the magnitude of the Doppler shift frequency $f_d$ being related to the velocity of the vortex. When a double peaked spectrum as illustrated in FIG. 6 is produced, the width of a peak at a specific intensity $\Delta f_b$ in FIG. 6, may also be related to the velocity.

A separate receiver channel is provided for each of the receiving beams, with the channels being identical and two additional channels are indicated in FIG. 5, with antennas 19a, 19b, receivers 11a, 11b and spectrum analyzers 45a, 45b.

Some preferred characteristics for a specific embodiment of the acoustic radar vortex detection system designed to meet the requirements of vortex measurement include:

a. Frequency range 2–8 khz. This is above the frequency of most of the ambient noise and below the frequencies which may suffer significant attenuation in traversing several hundred feet of air.

b. Antenna beamwidth and spatial resolution. The elevation beamwidth of a single beam is about 3°–5°, leading to a resolution at a (one-way) distance of 100–150 meters of about 5 or 10 meters, which is matched to the expected diameter of a vortex. More detailed studies of vortices with finer spatial resolution can be accomplished under controlled conditions at shorter range with finer antenna beams. The azimuthal beamwidth can be larger than the elevation beamwidth, since the vortex is expected to be extended in the axial or flight path direction.

c. Frequency resolution. The Doppler frequency for a given velocity depends on the scattering angle in a bistatic system. For a typical scattering angle of 60°, the Doppler frequency $f_d/f = v/c$ where $v$ is the velocity of the scatterer and $c$ the velocity of sound, is about 330 meters/sec. A Doppler width in one filter of 10 hz thus corresponds to a velocity interval of 1 meter/sec at a radar frequency of 3.3 khz. Typical vortex velocities of 15 or 20 meter/sec are thus well resolved. d) Integration interval. The effective coherent integration period of the Doppler filter just described is the reciprocal of the bandwidth, or 0.1 sec. Effective averaging is thus obtained by incoherent (i.e., after detection) integration over a period of order of one-half sec. This number is well matched to the interval during which a vortex is expected to be in a spatial resolution zone, shown above to be 5–10 meters across, since a typical vortex translational velocity (i.e., the motion of the entire vortex, not its internal motion) is typically 5 meters/sec. Motion of the entire vortex over longer intervals of time may be followed by observing its passage through other resolution zones.

An aspect of acoustic propagation that requires some consideration and therefore deserves mention is that atmospheric wind shear will deflect acoustic waves. Horizontal beam deflection will not significantly affect performance of the acoustic vortex detector for values of wind shear for which vortices remain a threat. Vertical deflection of an acoustic ray by a wind $u(z)$, where $u(z)$ is the horizontal wind velocity at altitude $z$ in the plane of propagation, can be computed from the formula $$\sin \epsilon = \sin \epsilon_0 + \frac{u(z)}{c}$$

where $\epsilon$ is the angle between the acoustic beam and the vertical, and $\epsilon_0$ is its value at the ground, where $u(0) = 0$. This equation can be rewritten to give the equation of the ray in the $(x, z)$ plane, as follows:

$$\left(\frac{dz}{dx}\right)^2 + 1 = \frac{1}{\left(\sin \epsilon_0 + \frac{u(z)}{c_0}\right)^2}$$

Using the approximation of linear shear, $u(z) = \alpha z$, this last equation can be easily solved to determine the required values of $\epsilon_0$ for the antennas in order for the common volume to be at an altitude $z$ at (ground) distance $x$ from the transmitter (or receiver). Typically, at a range of 150 meters, the actual beam position for a 10 meter/sec wind could be nearly 10 meters (or roughly a beamwidth) above or below its zero-wind (undeviated) position. By routine measurement of the vertical wind shear $\alpha = du/dz$, the apparent position of the scattering region can be adjusted to correct for the curvature of the acoustic beam propagation paths.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In an aircraft vortex detection system, the combination of:

an acoustic radar transmitter for directing a beam of acoustic energy toward a zone;

a receiver for said transmitter and spaced from said transmitter for receiving acoustic energy of said transmitter scattered by a vortex in said zone; and analyzer means having the receiver output as an input for generating an output signal varying as a function of the magnitude of the scattering.

2. A system as defined in claim 1 in which said receiver is a Doppler receiver for picking up Doppler frequency scattering by a vortex in said zone, and said analyzer includes a spectrum analyzer providing an output signal in the form of frequency and magnitude.

3. A system as defined in claim 2 in which said transmitter, said receiver and said zone lie in a plane generally perpendicular to the flight path of the aircraft producing the vortex so that opposing portions of the vortex are directed respectively toward and away from said receiver.

4. A system as defined in claim 3 in which said spectrum analyzer provides an output signal in the form of a frequency band, and in which the width of said frequency band at a predetermined magnitude varies as a function of the intensity of the vortex in said zone.

5. A system as defined in claim 1 wherein said transmitter and said receiver produce beams at said zone of a width to illuminate the entire vortex of interest.

6. A system as defined in claim 5 in which said receiver is a Doppler receiver for picking up Doppler frequency scattering by a vortex in said zone including the maximum frequency and the minimum frequency resulting from the maximum vortex velocity in the zone.

7. A system as defined in claim 6 in which said analyzer means includes a spectrum analyzer comprising a plurality of parallel signal processing channels and means for sampling the output of each of said channels and simultaneously displaying the outputs, each channel having said receiver output as an input and each channel including a band pass filter defining a narrow frequency band, and a detector and integrator for developing a channel output varying as a function of the magnitude of the receiver output in such frequency band.

8. A system as defined in claim 1 including a plurality of additional receivers and an analyzer means for each receiver, with each receiver spaced from said transmitter for receiving acoustic energy of said transmitter scattered by a vortex in additional zones adjacent the first said zone, with all of said zones illuminated by said transmitter and with each zone covered by a different receiver.

9. A system as defined in claim 1 in which said radar is a continuous wave radar.

10. A system as defined in claim 1 in which said radar is a pulse radar.

* * * * *